April 19, 1949.  G. E. CUTTAT  2,467,426
SAFETY DEVICE FOR ENDLESS SCREW CONTROL
Filed Dec. 28, 1946
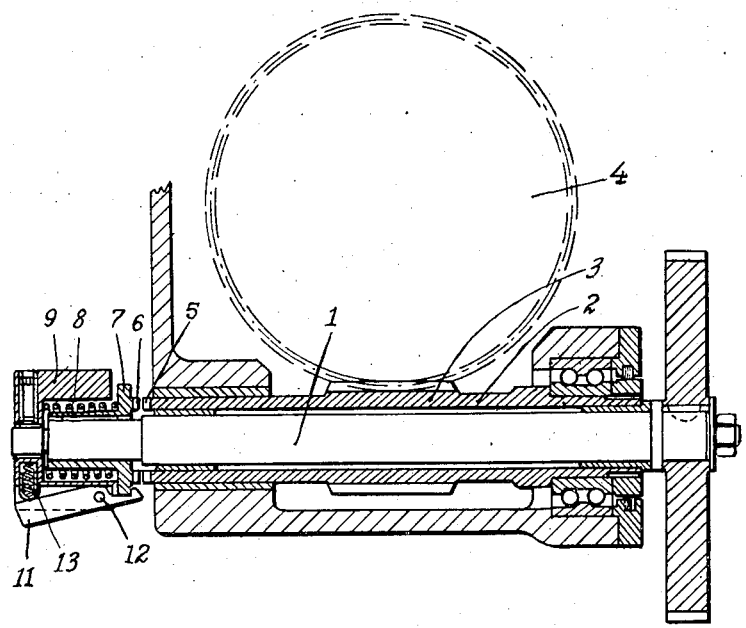
INVENTOR
Georges Emile Cuttat
By
ATTORNEY Patented Apr. 19, 1949

2,467,426

UNITED STATES PATENT OFFICE 2,467,426

SAFETY DEVICE FOR ENDLESS SCREW CONTROL

Georges Emile Cuttat, Geneva, Switzerland, assignor to Manufacture de Machines du Haut-Rhin, Haut-Rhin, France, a company of France Application December 28, 1946, Serial No. 719,088
In France November 22, 1941

Section 1, Public Law 690, August 8, 1946
Patent expires November 22, 1961

1 Claim. (Cl. 192—56)

In automatic lathes, the control of the main shaft carrying the cams which determines the motions of the various lathe organs is generally obtained by the gearing of an endless screw with a wheel having helicoidal teeth driving the main shaft. This type of control allows, particularly, the obtention of a high demultiplication.

In order to limit the overloads which may result from an occasional accident during the operation of the lathe, as for example by the breaking of a work piece, a jamming, an untimely intervention of chips, etc. it is known to provide, between the shaft carrying the endless screw and the driving shaft which drives it, a safety device consisting in teeth with inclined grooves, rotatably associated with one of these shafts and in teeth with inclined grooves rotatably associated with the other shaft, but capable of moving longitudinally with respect to it and pulled back by a spring. In case of an untimely resistance acting on the main shaft and, consequently, on the endless screw, the movable teeth rotatably associated with the driving shaft climb over the inclined grooves of the other teeth and get out of gear with the second set of teeth. The drawback of this arrangement, as it is used at present, is that the sets of teeth tend to come back together as soon as the overload decreases, with the result that the teeth come in contact noisily and get damaged.

The object of the present invention is a safety device of this type for an endless screw control acting on a shaft, and especially for the driving of the main shaft by the endless screw of an automatic lathe, whose characteristic is that one of the sets of teeth is provided on a hollow shaft carrying the endless screw, and concentrical with a driving shaft, while the other set is provided on a slide block pulled back in gear, elastically, and passed on the driving shaft, and capable only of moving in a longitudinal direction with respect to it, the driving shaft carrying a pawl capable of hooking with the slide block at its disengaged position.

One type of embodiment of the safety device according to the present invention is described hereinafter and represented by way of example, on the appended drawing.

On this drawing, 1 designates the driving shaft and 2 is the hollow shaft, with an endless screw 3, coaxial with the first one. This endless screw is in gear with a toothed wheel 4, keyed on the main shaft. At its end, hollow shaft 2 has a set of teeth 5, with adequately inclined grooves, gearing with another similar set of teeth 6, provided on slide block 7, which, by means of an appropriate cotter pin, can slide without turning on the end of driving shaft 1. Slide block 7 comprises a flange subjected to the action of a loaded pull back spring 8, bearing against adjustable nut 9, associated with the driving shaft 1. A pawl 11 is pivoted at 12 on an axle associated with nut 9; its hooked end is pulled back towards the shaft by spring 13.

In case a mechanical resistance occurs in the machine, the endless screw is blocked while driving shaft 1 keeps on rotating. Under such conditions, the inclined grooves of set of teeth 6 of slide block 7 climb over the inclined grooves of set of teeth 5 of shaft 3 with endless screw. At that moment, pawl 12 hooks with the flange of slide block 7, so that the two sets of teeth keep out of gear and shaft 2 can remain motionless. Once the cause of the overload has disappeared, the pawl can be unhooked by pressing on tail piece 11, overcoming the action of spring 13. Under the action of spring 8, the slide block comes back into position and its set of teeth 6 again gears with set of teeth 5.

Having now particularly described and ascertained the nature of my invention and the manner in which the same is to be performed, I declare that what I claim is:

An overload release clutch particularly suitable for use with an automatic lathe comprising a driving shaft, a hollow shaft forming a driven shaft coaxially and rotatively mounted on the driving shaft, a plurality of inclined teeth provided on one end of said hollow shaft, a slide block slidably but non-rotatively mounted on said driving shaft, a plurality of teeth provided on said slide block and able to engage the teeth of the hollow shaft, a spring surrounding the driving shaft and urging said slide block into a position of engagement with the teeth, a pawl mounted on the driving shaft for hooking with the slide block in the position of disengagement of the teeth, and resilient means urging said pawl into the position of hooking.

GEORGES EMILE CUTTAT.

REFERENCES CITED

The following references are of record in the file of this patent:

UNITED STATES PATENTS

| Number | Name | Date |
|---|---|---|
| 998,615 | Huneke | July 25, 1911 |
| 1,118,683 | Rindfleisch | Nov. 24, 1914 |
| 2,172,834 | Clausen | Sept. 12, 1939 |